(12) United States Patent
Yoshida et al.

(10) Patent No.: US 6,349,914 B1
(45) Date of Patent: Feb. 26, 2002

(54) SEAT SLIDE DEVICE FOR VEHICLES

(75) Inventors: Tadasu Yoshida, Kariya; Yukifumi Yamada, Toyota; Yasuhiro Kojima, Kariya; Takuo Yanagihara, Kakamigahara; Yasuhiko Mori, Kakamigahara; Masaru Wakayama, Kakamigahara, all of (JP)

(73) Assignees: Aisin Seiki Kabushiki Kaisha, Kariya; Gifu Shatai Kogyo Kabushiki Kaisha, Kakamigahara, both of (JP)

( * ) Notice: Subject to any disclaimer, the term of this patent is extended or adjusted under 35 U.S.C. 154(b) by 0 days.

(21) Appl. No.: 09/438,523

(22) Filed: Nov. 12, 1999

(30) Foreign Application Priority Data

Nov. 13, 1998 (JP) .............................. 10-323489

(51) Int. Cl.7 ................................................ B60N 2/02
(52) U.S. Cl. ...................... 248/429; 248/424; 248/430; 297/344.1
(58) Field of Search ................................ 248/424, 429, 248/430

(56) References Cited

U.S. PATENT DOCUMENTS

| | | | | | |
|---|---|---|---|---|---|
| 5,192,045 | A | * | 3/1993 | Yamada et al. | 248/429 |
| 5,407,166 | A | * | 4/1995 | Pilarski | 248/430 |
| 5,575,564 | A | * | 11/1996 | Harmon et al. | 384/34 |
| 5,676,341 | A | * | 10/1997 | Tarusawa et al. | 248/430 |
| 5,772,173 | A | * | 6/1998 | Couasnon | 248/430 |
| 5,775,662 | A | * | 7/1998 | Hoshihara et al. | 248/429 |
| 5,816,110 | A | * | 10/1998 | Schuler et al. | 248/527 |
| 5,829,728 | A | * | 11/1998 | Hoshihara et al. | 248/429 |
| 6,089,521 | A | * | 7/2000 | Tarusawa et al. | 248/430 |
| 6,113,051 | A | * | 9/2000 | Moradell et al. | 248/430 |

* cited by examiner

Primary Examiner—Anita King
Assistant Examiner—Steven Marsh
(74) Attorney, Agent, or Firm—Burns, Daone, Swecker & Mathis, LLP

(57) ABSTRACT

A seat slide device for vehicles includes a first and second rows of locking teeth which are formed along the longitudinal direction of the rail on a lower rail, a first flange portion which is formed on the locking lever opposed to the first row of locking teeth and is provided with a plurality of locking holes, and a second flange portion which is formed on the locking lever opposed to the second row of locking teeth.

7 Claims, 6 Drawing Sheets

SEAT SLIDE DEVICE FOR VEHICLES

BACKGROUND OF THE INVENTION

This invention relates to a seat slide device for vehicles.

A seat slide device for vehicles which can adjust the position of a vehicle seat forwardly or rearwardly is disclosed, for example, in Japanese Laid-open Patent Publication Hei 7-304361 (1995) and is known. This seat slide device generally includes a lower rail having an approximately U-shaped cross section which is adapted to be fixedly secured to a vehicle floor, an upper rail having an approximately inverted T-shaped cross section which is slidably supported with respect to the lower rail and to which a seat cushion is fastened, and a locking lever which is rotatably supported on the upper rail and is engaged with or disengaged from the lower rail to allow a sliding motion of the upper rail with respect to the lower rail.

The lower rail of this conventional seat slide device is provided with the row of locking holes arranged along the longitudinal direction of the lower rail, while a plurality of locking teeth which are adapted to be fitted into some of the row of the locking holes are formed in the locking lever. Furthermore, an auxiliary plate in which the row of through holes are formed and extends in the longitudinal direction of the upper rail is fixedly mounted on the upper rail, wherein the row of the through holes are disposed close to the row of the locking holes and the locking teeth pass through the through holes.

In such a construction, upon rotation of the locking lever, the locking teeth of the locking lever pass through the row of through holes of the auxiliary plate and are fitted into the row of locking holes of the lower rail so that the locking lever is engaged with the lower rail and the slide movement of the upper rail relative to the lower rail is restricted (a locked state).

Furthermore, upon rotation of the locking lever in a reverse direction, the locking teeth of the locking lever are released from the row of locking holes of the lower rail and the row of through holes of the auxiliary plate so that the locking lever is disengaged from the lower rail and the slide movement of the upper rail relative to the lower rail becomes possible (an unlocked state).

Under the afore mentioned locked state, when a load is applied in the longitudinal direction of the rail due to a collision of the vehicle or the like, since the locking teeth of the locking lever are not only fitted into the row of the locking holes of the lower rail but also pass through the row of the through holes of the auxiliary plate disposed close to the locking teeth, this load is received as a shearing load and hence, a high locking strength is assured.

However, in such a conventional device, to assure the high locking strength, the auxiliary plate which is provided with the row of the through holes through which the locking teeth of the locking lever pass and which extends in the longitudinal direction of the rail becomes necessary, and furthermore, since the row of the through holes must be disposed close to the row of the locking holes, the auxiliary plate widens the width of the rail, increases the weight and raises the cost.

Accordingly, it is an object of the present invention to provide a seat slide lock device for vehicles which can assure a high locking strength without enlarging the width of a rail.

SUMMARY OF THE INVENTION

To achieve the above object of the present invention, there is provided a seat slide device including a first and second row of locking teeth which are formed on a lower rail along the longitudinal direction of the rail such that these rows of the locking teeth are disposed in an opposed manner while sandwiching a locking lever therebetween, a first flange portion which is formed on the locking lever opposed to the first row of the locking teeth and is provided with a plurality of locking holes into which some of the first row of the locking teeth are fitted, and a second flange portion which is formed on the locking lever opposed to the second row of the locking teeth and is capable of coming into contact with some of the second row of the locking teeth in a direction perpendicular to the longitudinal direction of rail.

According to such technical conception, upon rotation of the locking lever, the locking lever is engaged with the lower rail such that the first row of the locking teeth of the lower rail are fitted into the locking holes of the first flange portion of the locking lever and hence, the slide movement of the upper rail relative to the lower rail is restricted (a locked state). Here, the second flange portion of the locking lever comes into contact with the second row of the teeth of the lower rail perpendicular to the longitudinal direction of the rail.

Furthermore, upon rotation of the locking lever in a reverse direction, the first row of the locking teeth of the lower rail are released from the locking holes of the first flange portion of the locking lever so that the locking lever is disengaged from the lower rail and the slide movement of the upper rail relative to the lower rail becomes possible (an unlocked state).

In the above-mentioned locked condition, when the load is applied in the longitudinal direction of the rail due to a collision of vehicle or the like, in addition to the fitting engagement between the locking holes of the first flange portion of the locking lever and the first row of the locking teeth of the lower rail, the second flange portion of the locking lever comes into contact with the second row of the locking teeth of the lower rail and hence, this load is shared and supported in two rows in the longitudinal direction of the rail as a shearing load thus assuring the high locking strength.

Accordingly, the auxiliary plate which has been conventionally necessary is no longer necessary so that the high locking strength can be attained without increasing the width of the rail.

In a preferred construction, the second flange portion is provided with a plurality of through holes through which some of the second row of locking teeth pass and the front and rear walls of the through holes in the longitudinal direction of rail can be brought into contact with some of the second row of the locking teeth with a given gap or play.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Preferred embodiments of this invention are explained in detail in conjunction with attached drawings.

Figure 1:
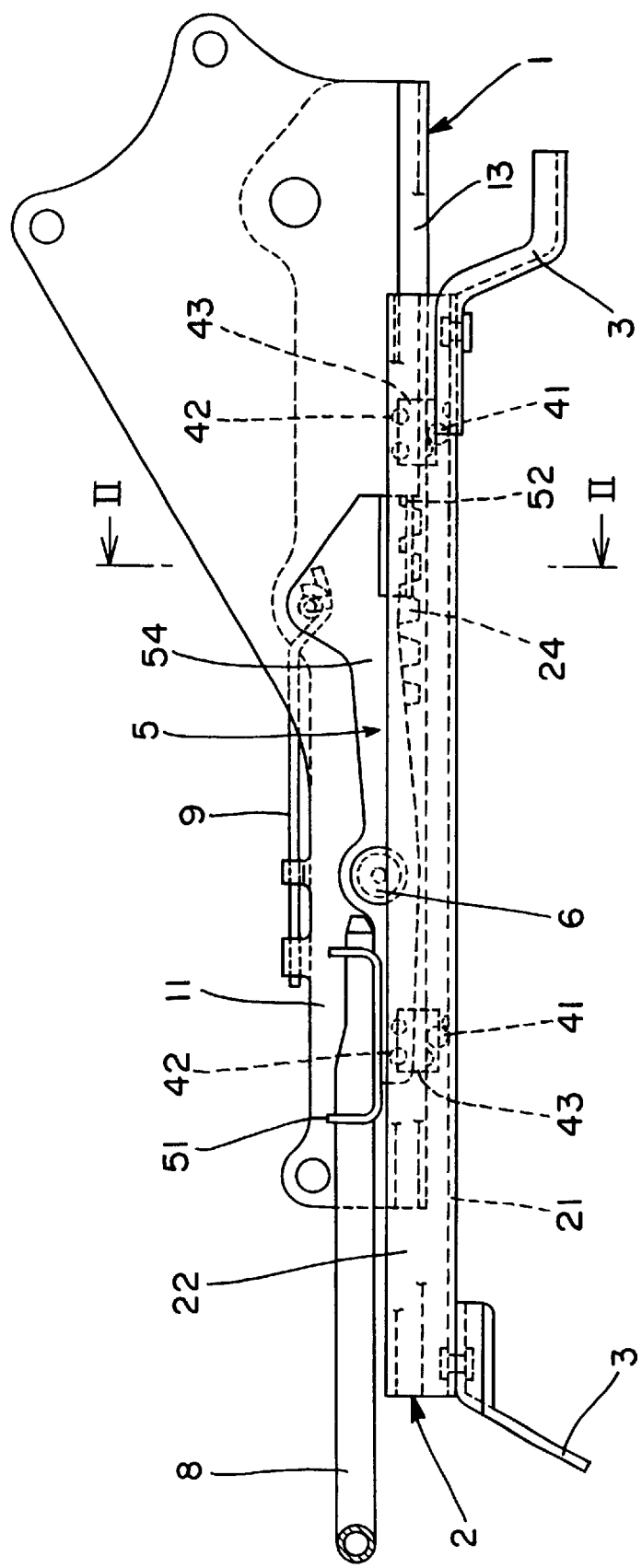
FIG. 1 is a front view of a seat slide device for vehicle according to the present invention.
Figure 2:
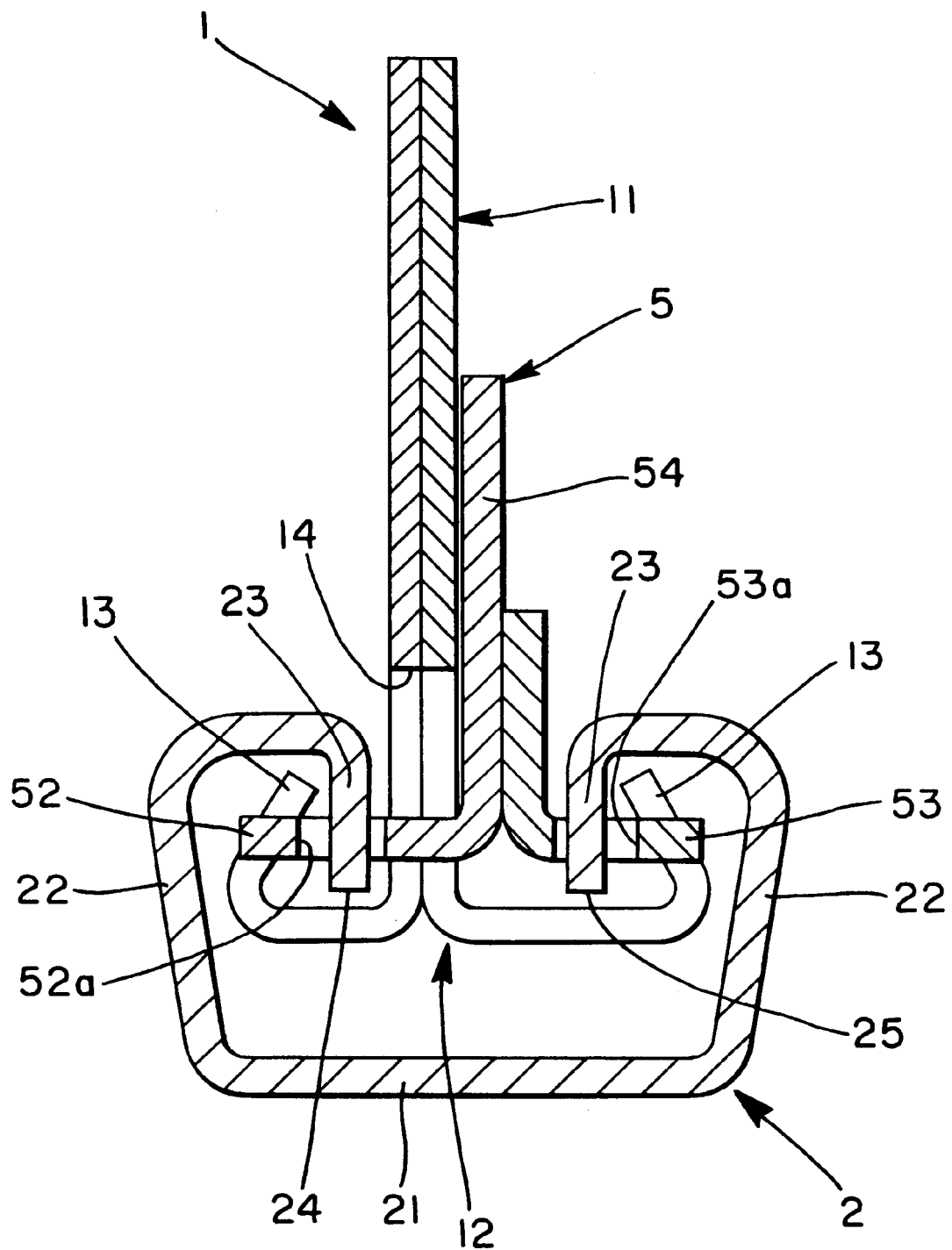
FIG. 2 is a cross sectional view taken along a line II—II of FIG. 1.
Figure 3:
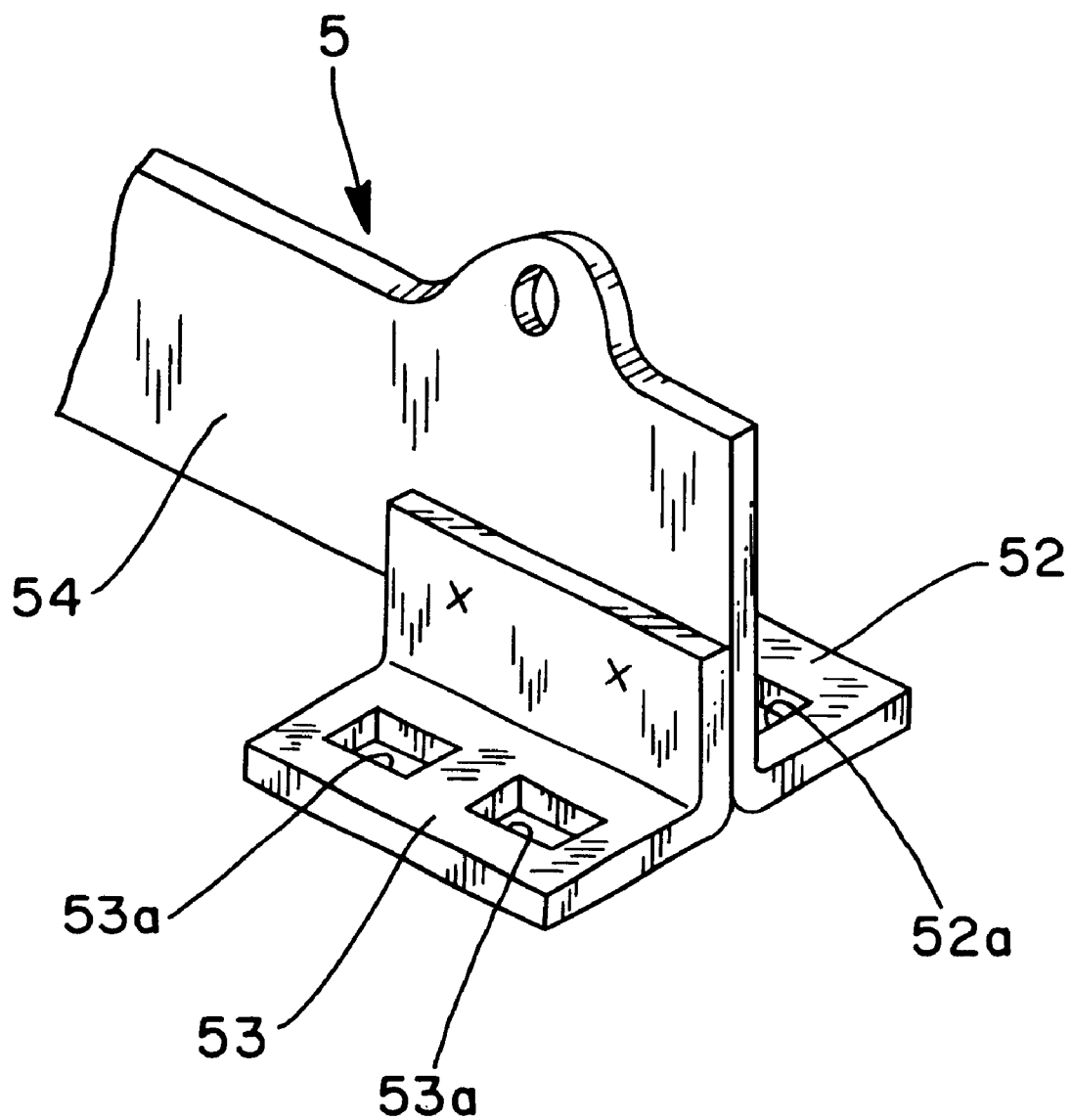
FIG. 3 is a perspective view of a locking lever of the seat slide device for vehicle according to the present invention.

As shown in FIG. 1 and FIG. 2, an upper rail 1 which supports a seat cushion of a vehicle (not shown in drawings) has an inverted T-shaped cross section and includes a longitudinal wall 11 which extends in a vertical (an up-and-down) direction of the rail (as seen in FIG. 1 and FIG. 2) and a lateral wall 12 which extends in a widthwise direction of the rail (a left-and-right direction in FIG. 2). Furthermore, at both ends of the lateral wall 12, a pair of first flange walls 13 which extend in an oblique direction toward the inside of the rail and upwardly are formed. The upper rail 1 is made of two plate members which are bent in opposite directions from each other thus forming an L-shape respectively and the longitudinal wall 11 is comprised of the adhered portions of these two plate members. Namely, the upper rail 1 is preferably formed from two folded and pressed sheet metal materials which are secured together.

A lower rail 2 which is arranged to be fixedly secured to a floor of the vehicle (not shown in drawings) has an approximately U-shaped cross section and is provided with a bottom wall 21 which extends in a widthwise direction of the rail and a pair of side walls 22 which extend in an up-and-down direction of the rail. Furthermore, to the distal ends of both side walls 22, a pair of second flanges walls 23 which extend toward the inside of the rail and downwardly are provided. The lower rail 2 is made of a single plate metal material.

The lateral wall 12 of the upper rail 1 is disposed between the side walls 22 and parallel to the bottom wall 21 of the lower rail 2 such that the longitudinal wall 11 of the upper rail 1 extends through and between the second flange walls 23 of the lower rail 2 and the first flange walls 13 are opposed to the second flange walls 23.

As shown in FIG. 1, between the lateral wall 12 of the upper rail 1 and the bottom wall 21 of the lower rail 2, a roller 41 is provided, while between both first flange walls 13 of the upper rail 1 and corner portions between both second flange walls 23 and both side walls 22 of the lower rail 2, bails 42 are respectively provided. This roller 41 and a pair of balls 42 facilitate the smooth slide movement of the upper rail 1 relative to the lower rail 2.

Considering the easiness in assembling this roller 41 and the balls 42, they are connected and assembled as a unit by means of a plate member 43. Furthermore, a plurality of units made of the roller 41 and the balls 42 are disposed in the longitudinal direction of the rail.

Due to such a construction, the upper rail 1 is supported by the lower rail 2 such that the upper rail 1 is slidable in the longitudinal direction of the rail (a left-and-right direction in FIG. 1). The seat is supported by the longitudinal wall 11 by way of or without a reclining mechanism or a vertical mechanism (not shown in drawings), while the lower rail 2 is fixedly secured to the floor by way of brackets 3 (see in FIG. 1) which are fixedly secured to both ends of the bottom wall 21 in the longitudinal direction of the rail. Due to the slide movement of the upper rail 1 relative to the lower rail 2, the position of the seat can be adjusted at a desired frontward or rearward position.

Figure 4:
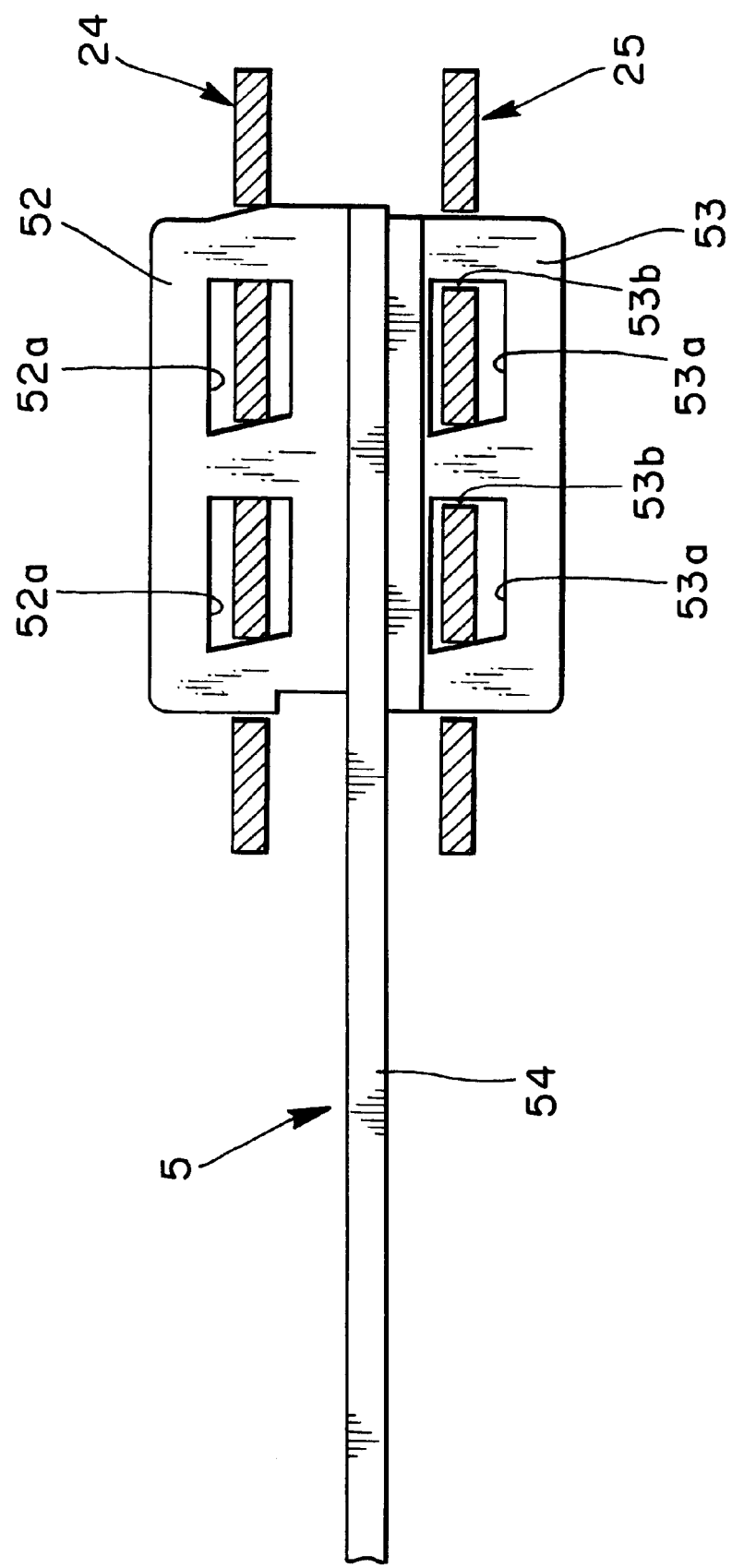
FIG. 4 is a front view showing an engaged condition of a locking lever and a lower rail of the seat slide device for vehicle according to the present invention.

As shown in FIG. 1 and FIG. 4, on the longitudinal wall 11 of the upper rail 1, a locking lever 5 is disposed at the inside in a widthwise direction of the rail (right side in FIG. 2) relative to the longitudinal wall 11 and is rotatably supported by means of a pin 6. This locking lever 5 has a body portion 54 thereof which is made of a single plate member extended in the longitudinal direction of the rail such that the body portion 54 extends between the second flange walls 23 of the lower rail 2. A substantially central portion of the locking lever 5 is supported by the upper rail 1.

To one end side of the locking lever 5, a mounting flange 51 which extends inwardly in a widthwise direction of the rail (the right direction in FIG. 2) and which is disposed outside of the U-shaped cross section of the lower rail 2 is provided. To the other end side of the locking lever 5 which is disposed in the U-shaped cross section of the lower rail 2, a first engaging flange 52 which extends outwardly in a widthwise direction of the rail (the left direction in FIG. 2) and a second engaging flange 53 which extends inwardly in a widthwise direction of the rail (the right direction in FIG. 2) are provided.

A manipulation handle 8 is connected to the mounting flange 51 by means of a mounting spring 7 (not shown in drawings).

The first engaging flange 52 is integrally formed with the body portion 54 of the locking lever 5 by bending the lower surface of the one end of the body portion 54 at an approximately right angle outwardly in a widthwise direction of the rail and is disposed within a cut-off portion 14 formed in a predetermined portion of the upper rail in the longitudinal direction of the rail. The first engaging flange 52 faces one of the second flange walls 23 (the second flange wall 23 at the left side in FIG. 2) of the lower rail 2 in an opposed manner. A pair of locking holes 52a which are arranged in the longitudinal direction of the rail are formed on this first engaging flange 52.

The second engaging flange 53 is disposed on the same plane as the first engaging flange 52 and is welded to one end of the body portion 54. As in the case of the first engaging flange 52, the second engaging flange 53 is disposed in the cut-off portion 14 of the upper rail 1 and faces the other one of the second flange walls 23 (the second flange wall 23 at the right side in FIG. 2) of the lower rail 2 in an opposed manner. A pair of through holes 53a which are arranged in the longitudinal direction of the rail are formed on this second engaging flange 53.

Figure 5:
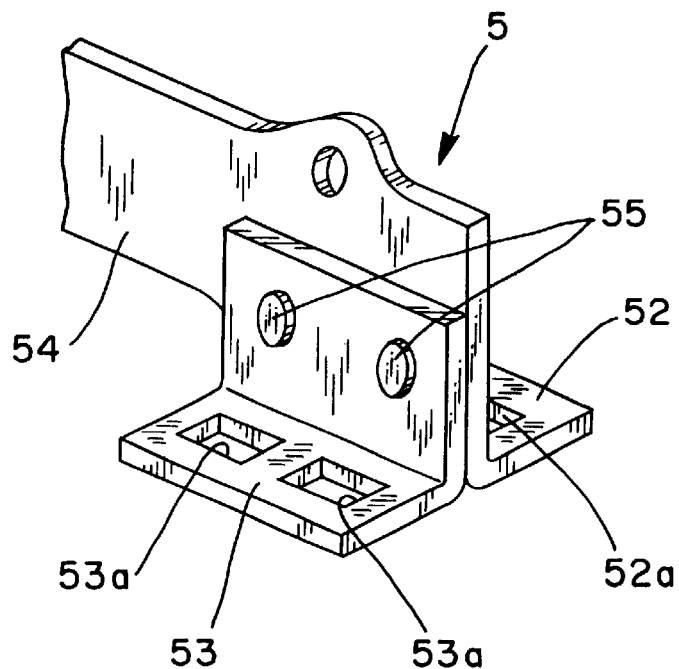
FIG. 5 is a perspective view corresponding to FIG. 3 which shows a first modification of the locking lever of the seat slide device for vehicle according to the present invention.

As shown in FIG. 5, the second engaging flange 53 may be fixedly secured to the body portion 54 by means of fixing members 55 such as rivets or small bolts.

Figure 6:
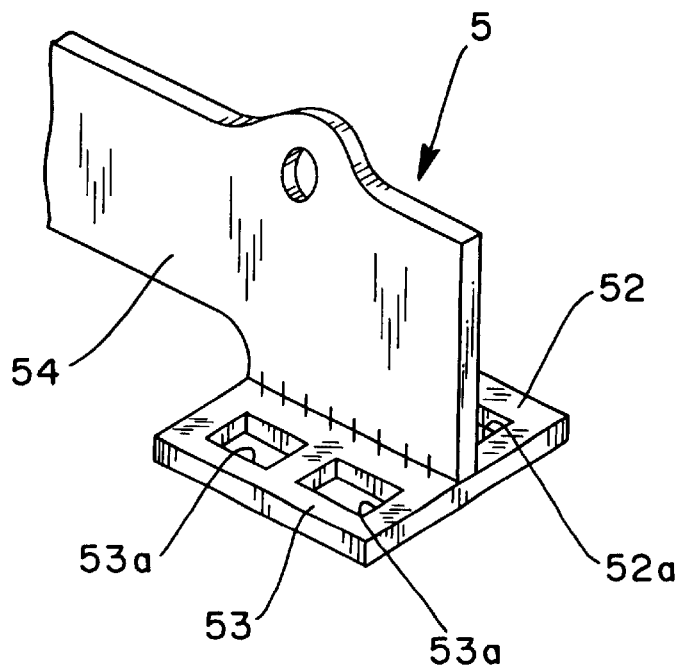
FIG. 6 is a perspective view corresponding to FIG. 3 which shows a second modification of the locking lever of the seat slide device for vehicle according to the present invention.

As shown in FIG. 6, the first engaging flange 52 and the second engaging flange 53 may be made of a single plate and this single plate may be welded to the lower surface of one end of the body portion 54.

Figure 7:
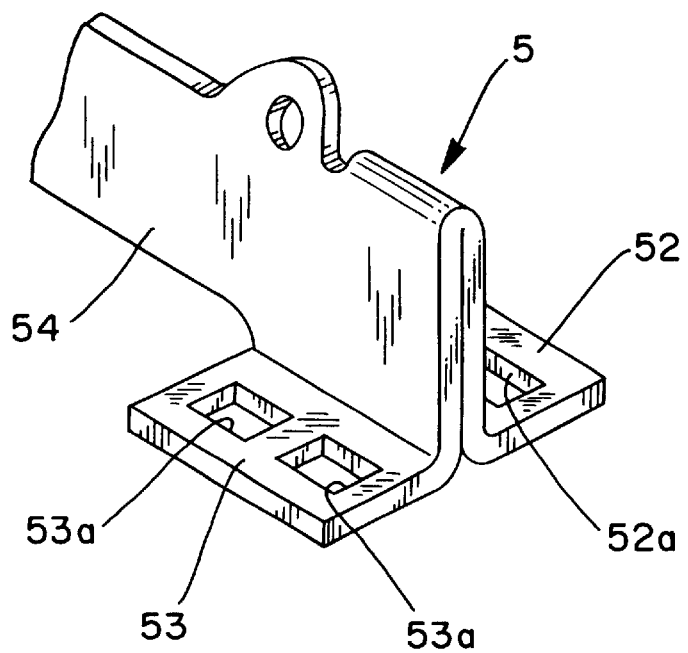
FIG. 7 is a perspective view corresponding to FIG. 3 which shows a third modification of the locking lever of the seat slide device for vehicle according to the present invention.

As shown in FIG. 7, the first engaging flange 52 may be integrally formed with the body portion 54 by bending one end (which extends upwardly) of the body portion 54 and the second engaging flange 53 is also integrally formed with the body portion 54 by bending the lower surface of one end of the body portion 54.

As shown in FIG. 1 or FIG. 4, in one of the second flange walls 23 of the lower rail 2, the first row of locking teeth 24 are formed in the longitudinal direction of the rail. Upon rotation of the locking lever 5, this first row of locking teeth 24 are fitted into the locking holes 52a of the first engaging flange 52 and due to such a fitting operation, the locking lever 5 is engaged with the lower rail 2 and hence, the slide movement of the upper rail 1 in the longitudinal direction relative to the lower rail 2 is restricted (the locked state).

In the other of the second flange walls 23 of the lower rail 2, the second row of locking teeth 25 which are arranged in the same longitudinal direction of the rail as the first row of locking teeth 24 are formed. Upon rotation of the locking lever 5, the second row of locking teeth 25 pass through the through holes 53a of the second engaging flange 53 and the surfaces of the second row of locking teeth 25 which are approximately perpendicular to the longitudinal direction of the rail face the surfaces of the through holes 53a which are substantially perpendicular to the longitudinal direction of the rail with a given gap or clearance 53b such that the surfaces of the second row of locking teeth 25 can come into contact with the surfaces of the through holes 53a (see FIG. 4).

Between the longitudinal wall 11 of the upper rail 1 and the locking lever 5, a rod-like spring 9 is disposed. By receiving the biasing force of this spring 9, the locking lever 5 is always biased in a direction (a counter clockwise direction in FIG. 1) to make the locking holes 52a engaged with the first row of locking teeth 24 and hence, the fitting condition between the locking holes 52a and the first row of locking teeth 24 is held and, at the same time, the second row of locking teeth 25 are made to pass through the through holes 53a.

On the other hand, upon rotation of the locking lever 5 in a reverse direction (in a clockwise direction in FIG. 1) against the biasing force of the spring 9 which is generated by manipulating the manipulating handle 8, the fitting condition between the locking holes 52a and the first row of locking teeth 24 is released and the second row of locking teeth 25 are also removed from the through holes 53a. Accordingly, the engagement between the locking lever 5 and the lower rail 2 is released thus allowing the longitudinal slide movement of the upper rail 1 relative to the lower rail 2 (the unlocked state).

In the locked state shown in FIG. 2, when the load in the longitudinal direction of the rail is applied to the upper rail 1 at the time of the collision of vehicles or the like, in addition to the fitting engagement between the locking holes 52a of the first engaging flange 52 of the locking lever 5 and the first row of locking teeth 24 of the lower rail 2, the second engaging flange 53 of the locking lever 5 and the second row of locking teeth 25 of the lower rail 2 which have their respective surfaces disposed perpendicular to the longitudinal direction of the rail come into contact with each other and hence, the load is shared and received as a shearing load in two rows in the longitudinal direction of the rail while sandwiching the body portion 54 of the locking lever 5 between these two rows. Accordingly, the high locking strength is assured.

Figure 8:
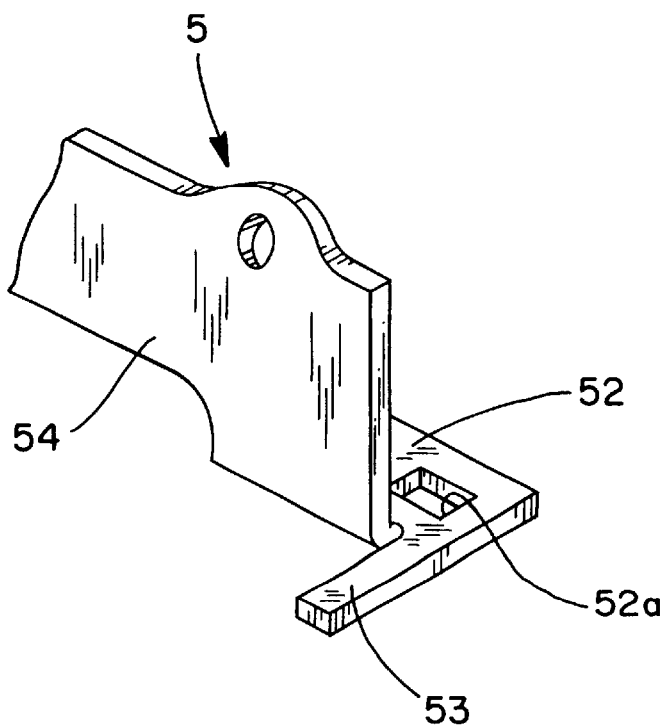
FIG. 8 is a perspective view corresponding to FIG. 3 which shows a fourth modification of the locking lever of the seat slide device for vehicle according to the present invention.

As shown in FIG. 8, the second engaging flange 53 may be integrally formed with the first engaging flange 52 such that the second engaging flange 53 extends outwardly in the widthwise direction of the rail from the first engaging flange 52 and the second engaging flange 53 may be formed in a rod-like or flat plate-like shape and inserted between teeth of the second row of locking teeth 23 of the lower rail 2. In this case, no through holes are formed in the second engaging flange 53 and the second engaging flange 53 can make the side surfaces thereof which are disposed approximately perpendicular to the longitudinal direction of the rail come into contact with the surfaces of the locking teeth 23 which are disposed approximately perpendicular to the longitudinal direction of the rail.

As many apparently widely different embodiments of the present invention can be made without departing from the spirit and scope thereof, it is to be understood that the invention is not limited to the specific embodiments thereof except as defined in the appended claims.

What is claimed is:

1. A seat slide device for vehicles comprising a lower rail having an approximately U-shaped cross section which is adapted to be fixedly secured to a floor of a vehicle, an upper rail having an approximately inverted T-shaped cross section which is slidably supported on said lower rail and adapted to support a seat cushion of said vehicle, and a locking lever which is rotatably supported on said upper rail and is engaged with or disengaged from said lower rail, a first and second row of locking teeth which are formed along the longitudinal direction of the rail on said lower rail such that said rows of locking teeth are disposed in an opposed manner while sandwiching said locking lever therebetween, a first flange portion which is formed on said locking lever opposed to said first row of locking teeth and is provided with a plurality of locking holes into which some of said first row of locking teeth are fitted, and a second flange portion which is formed on said locking lever opposed to said second row of locking teeth and is capable of coming into contact with some of said second row of locking teeth in a direction perpendicular to the longitudinal direction of the rail, said second flange portion being provided with a plurality of through holes having front and rear walls located in the longitudinal direction of the rail, several of said second row of locking teeth passing through the through holes in the second flange portion with a gap between each of said several teeth and at least one of the front and rear walls of the respective through hole in the second flange portion so that said gap causes the second flange portion to be unloaded in the absence of a collision, each of the several teeth being adapted to contact said at least one of the front and rear walls upon the occurrence of a collision so that a load resulting from the collision is applied to the second flange portion.

2. A seat slide device according to claim 1, wherein said second flange portion is formed by a horizontally extending portion from an end portion of a vertical wall portion of said locking lever, which is located between the teeth when said locking holes of said first flange portion are fitted to some of said first row of locking teeth.

3. A seat slide device for a vehicle, comprising:
   a lower rail adapted to be secured to a vehicle body and having a horizontal bottom wall portion, upwardly extending side wall portions extending from both ends thereof, and a plurality of downwardly extending teeth formed on distal ends of the side wall portions;
   an upper rail adapted to support a seat cushion and axially slidably engaged with the lower rail; and
   a locking lever rotatably supported on the upper rail and having a pair of flange portions laterally extending in opposed directions;

the flange portions of the locking lever being located inside of the lower rail and each having a line of holes into which some of the teeth are inserted, the holes in one of the flanges having front and rear walls in the longitudinal direction of the rail, and including a gap between the teeth positioned in the holes in the one flange and at least one of the front and rear walls of the holes in the one flange so that said gap causes the second flange portion to be unloaded in the absence of a collision, each of the teeth positioned in the holes of the one flange being adapted to contact said at least one of the front and rear walls upon application of a load in the axial direction of the upper rail so that a load resulting from the collision is applied to the second flange portion.

4. A seat slide device according to claim 3, wherein the holes formed on the other flange portion are used to effect engagement of the upper rail which the lower rail when some of the teeth formed on the other side portion are inserted into the holes of the other flange portion.

5. A seat slide device according to claim 4, wherein one of the flange portions is constructed by a L-shaped bracket member which is fixed on a vertical wall portion of the locking lever, and the other flange portion is constructed by horizontally folding the lower end of the vertical wall portion of the locking lever.

6. A seat slide device according to claim 4, wherein the flange portions are made of a single plate which is welded to an end portion of a vertical wall portion of the locking lever.

7. A seat slide device according to claim 4, wherein the locking lever has a vertical wall portion on which an upwardly extending plate-like portion and a downwardly extending plate-like portion are provided and the flange portions are formed by bending these plate-like portions.

* * * * *